2 Sheets--Sheet 1.

H. W. SABIN.

Horse Hay-Rakes.

No. 5,243. Reissued Jan. 21, 1873.

Witnesses.
C. F. Brown
Melville Church

Calista E. Cox.
Executrix of
H. W. Sabin.
By Attys.
Hue Ellsworth

AM. PHOTO-LITHOGRAPHIC CO. N.Y. (OSBORNE'S PROCESS.)

2 Sheets--Sheet 2.

H. W. SABIN.

Horse Hay-Rakes.

No. 5,243. Reissued Jan. 21, 1873.

Witnesses.
C. F. Brown.
Melville Church.

Calista E. Coy.
Executrix of
H. W. Sabin.
By Attys.
Hill & Ellsworth

AM. PHOTO-LITHOGRAPHIC CO. N.Y. (OSBORNE'S PROCESS)

UNITED STATES PATENT OFFICE.

CALISTA E. COX, OF WEST SOMERSET, NEW YORK, EXECUTRIX OF HARVEY W. SABIN, DECEASED.

IMPROVEMENT IN HORSE HAY-RAKES.

Specification forming part of Letters Patent No. 7,813, dated December 3, 1850; extended seven years, and again extended seven years by act of Congress from June 8, 1872; reissue No. 5,243, dated January 21, 1873.

DIVISION B.

*To all whom it may concern:*

Be it known that HARVEY W. SABIN, late of Canandaigua, in the county of Ontario and State of New York, now deceased, was the inventor of certain new and useful Improvements in Horse Hay-Rakes, for which Letters Patent of the United States were granted him for the term of fourteen years from the 3d day of December, 1850, and that the said patent was duly renewed and extended for the term of seven years from and after the expiration of the first term—to wit, from December 3, 1864—and was again extended by the Commissioner of Patents, by virtue of a special act of Congress, for the further term of seven years from and after the 8th day of June, A. D. 1872; and I, CALISTA E. COX, of West Somerset, in the county of Niagara and State of New York, executrix of the last will and testament of said HARVEY W. SABIN, deceased, and sole owner of the extended term of said Letters Patent, do hereby declare the following to be a full, clear, and exact description of the construction of that part of the invention which I designate an arrangement of articulating contrivances which have their support directly upon the axle of the rake-carriage, reference being had to the accompanying drawing forming a part of this specification, in which—

Figure 1:
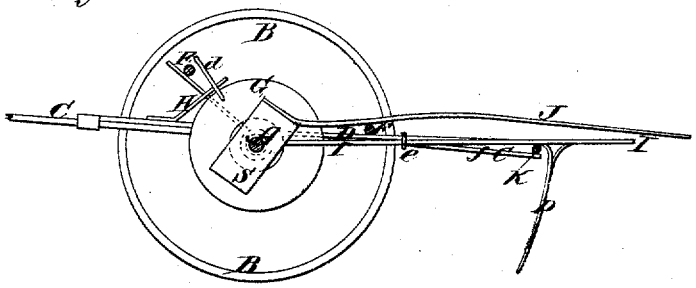
Figure 2:
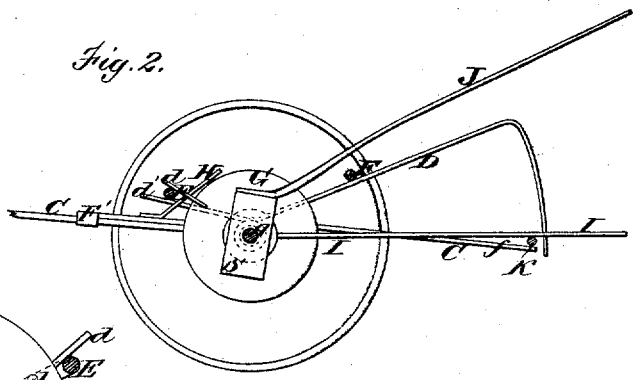
Figure 4:
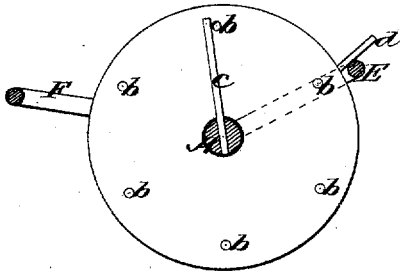
Figure 3:
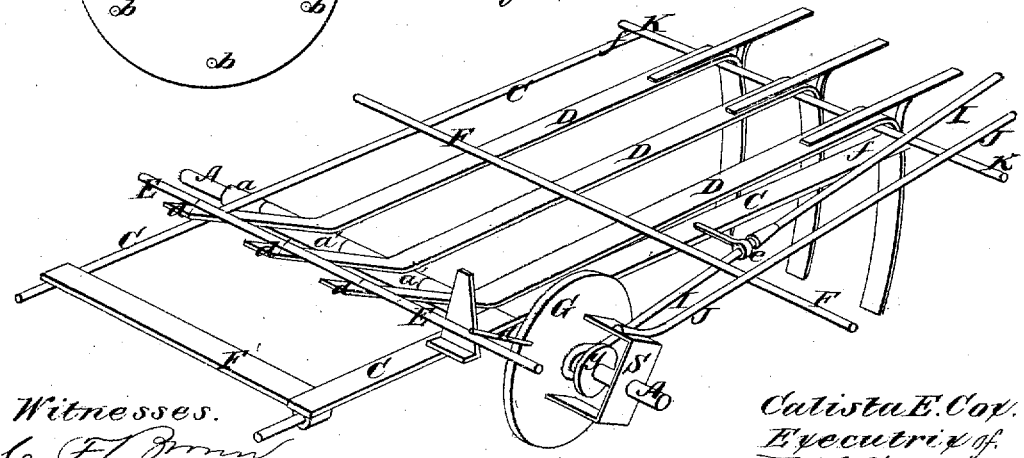
Figure 5:
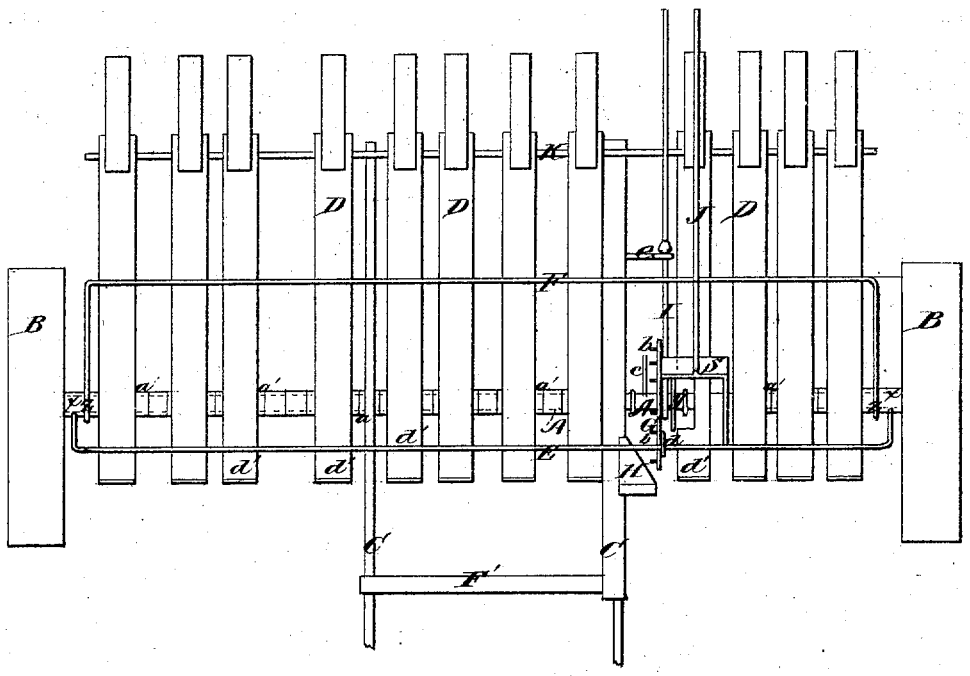

Figure 1 is a vertical longitudinal section of the rake as it appears when the teeth are in raking position. Fig. 2 is a section similar to Fig. 1, and shows the teeth when in discharging position. Fig. 3 is a perspective view of a portion of the rake as it appears when in raking position. Fig. 4 is a detail view, and Fig. 5 a plan or top view of a rake complete with the invention applied to it.

Similar letters of reference in the accompanying drawing indicate the same parts.

The nature of the invention covered by this patent consists, first, in arranging rake-teeth directly on the axle of the carriage-wheels, and so that they can articulate upon said axle; second, in arranging an oscillating bar for raising rake-teeth directly on the axle of the carriage-wheels, and so that it can articulate on said axle; third, in arranging an oscillating bar for exerting pressure upon rake-teeth upon the axle of the carriage-wheels, and so that it can articulate on said axle as its center of motion; fourth, in arranging an oscillating lever or levers on the axle of the carriage-wheels, and so that it or they can articulate on said axle; fifth, it consists in arranging a clearer to rake-teeth on an extension of the thills in rear of the carriage-wheels, and so that with the thills it can articulate or oscillate on said axle, the axle extending entirely across the carriage-frame, as will be hereinafter described.

By means of the invention above stated the necessity for using a separate shaft for any or all of the several elements named is avoided, and thus the construction of the rake is simplified and cheapened. Beside this, the tubular eye-bearings of the rake-teeth and of the other named elements of the rake are made available for strengthening the carriage-axle, and thus simplicity and cheapness with durability are secured.

To enable others skilled in the art to make and use this invention, I will proceed to describe the same with reference to the drawing.

In the accompanying drawing, A is the carriage and supporting axle; B B, two transporting-wheels, one of which is made fast upon the axle so as to rotate with it. C C are thills or shafts. They are extended back upon and beyond the axle A, and, by means of tubular bearings *a a*, are connected to the same in such manner that they are free to turn independently of the axle. On the rear extensions of the thills a transverse bar or rod, K, is arranged, and at some distance forward of the axle A a cross-piece, F′, is applied to them, so as to brace them and afford a means for attaching the single-tree to which the horse is harnessed. The bar K serves to support all the rake-teeth at a proper raking relation to the ground, and it also serves the important office of clearing the gathered hay from the rake-teeth when the rake is elevated for the purpose of discharging its load. D D are rake-teeth, made of springy metal and of any approved style and shape, and connected to the axle A by articulating eye-bearings *a′ a′*, which allow the teeth freedom to articulate independently of the axle while raking or discharging the hay. The eye-bearings are of tubular form and much longer than the width of the teeth, and they are slipped upon the axle A in such manner that they abut against one another, and thus serve to stay the axle, while they serve as lateral braces and supports to the teeth, which are narrow and arranged at some distance apart, as represented. The teeth attach to the top of the bearings *a′ a′*, and extend therefrom forward and upward, as shown at *d′ d′*. This forward extension of the teeth is such that it insures the proper elevation of the raking ends of the teeth for the clearing of the gathered hay therefrom. Upon the axle A is loosely fitted an oscillating and sliding disk or wheel G, in the face of which a series of pins, *b b*, is set so as to form a circle, and from or near the circumference of the said disk a single lifting-pin, *d*, extends in a direction at right angles to the pins *b b*, as represented. This disk also has a grooved collar, *y*, formed on it, and the same is loosely encircled or clasped by a clutch-lever, I, which is pivoted or fulcrumed at *e* on one of the thills, and therefrom extended to a point convenient for the attendant to lay hold of and move it in a horizontal direction whenever it is desirable to couple the rake with the axle A. Near and opposite that face of the disk in which the pins *b b* are set a coupling-pin, *c*, projects from the axle so as to stand opposite a space between one or another pair of the pins *b*. Said pin *c* and the pins *b b* serve as a means whereby the axle and disk can be geared together, and thus both turn together. To effect this gearing together of these parts it is only necessary to lay hold of the clutch-lever I and move it in such a direction as will cause the disk to slide on the axle toward the pin *c*, this movement bringing one or another pair of the pins *b b* in such a position with respect to the pin *c* that said pin *c* will stand between them; and therefore when the axle is moved it carries the disk with it. It is evident from the foregoing that the lever I with the disk G articulates about the axle A as a center of motion, the lever being fulcrumed upon and moving with the thills. E represents what may be termed a tilting frame, and F an oscillating pressure-frame. The tilting frame E is jointed loosely on the axle A near the wheels B B by means of tubular boxes or sleeves *x x*, to which it is rigidly fastened, while the pressure-frame F is loosely jointed upon said sleeves or boxes *x x* by means of coils *z z* on the termini of the said bars. Thus attached or connected to the axle A the frame E is free to turn or oscillate independently of the axle and of the frame F, while the frame F is free to turn or oscillate independently of both the axle and the frame E. The transverse bar of the frame E rests against the upper side of the forward extensions of the teeth, while the transverse bar of the frame F rests down upon the teeth in rear of the axle A. From the foregoing it is evident that the tilting frame and the pressure-frame articulate about the axle A as a center of motion. J is a hand-lever fastened to a hub, S, of the oscillating disk. This lever articulates with the disk G directly on the axle A, and it extends to a convenient point over the transverse bar of the frame F, to be controlled by the attendant of the machine. By means of this lever the attendant can, when necessary, or at will, exert any required pressure upon the transverse bar of the frame F, and thus keep all of the metallic spring-teeth to their work; or with it all of the teeth, when necessary to clear formidable obstructions, may be thrown up and again allowed to fall back to their raking positions; for, by moving the lever upward when the axle is not in gear with it, the disk will move with it and the lifting-pin *d* be caused to press down against the front or tilting frame E, and said frame thereby caused to elevate the raking ends of the teeth.

To elevate the teeth by hand it is not necessary to couple the disk with the axle, and therefore the gathered hay upon the teeth may, at the will of the operator, be discharged either by manual or horse power; and to make the rake self-ungearing and capable of resetting itself where horse-power for discharging the gathered hay is employed the inclined trip H is attached to one of the thills in such relation to the tripping-pin *d* of the disk G that after the disk has been set in gear with the axle and the rake is being elevated and its load discharged by the draft or power of the team the said-lifting-pin will come in contact with this trip H, and, at the proper moment, cause the disk to slide laterally on the axle and release its pins *b* from the coupling-pin *c*, and thus allow the frames E and F, with the disk, rake-teeth, and hand-lever J, to go back or reset themselves in their original positions, ready for gathering a fresh load. The length of the pins *b* and the form of the trip H are such that the pin *d* will be tripped when the rake-teeth have risen high enough to have the hay cleared from them by the rod or bar K.

The contrivances for enabling the draft of the team to discharge the gathered hay and the rake to reset itself are not claimed under this patent, as they are embraced in Division No. 1 of this reissue.

I have clearly shown that all of the main elements of the rake are supported upon and allowed freedom to articulate on the carriage-axle; and it is evident that this arrangement of the same saves the expense of an extra shaft for their support, which is an item of some importance in the manufacture of rakes; beside this, the rake is light and durable.

What I claim as new, and desire to secure by Letters Patent, is—

1. Rake-teeth arranged directly on the axle of the carriage-wheels, and so that they can articulate upon said axle, for the purpose set forth.

2. An oscillating bar for raising rake-teeth arranged directly on the axle of the carriage-wheels, and so that it can articulate on said axle, for the purpose set forth.

3. An oscillating bar for exerting pressure upon rake-teeth arranged upon the axle of the carriage-wheels, and so that it can articulate on said axle as its center of motion, for the purpose set forth.

4. An oscillating pressure-lever or a coupling-lever arranged on the axle of the carriage-wheels, and so that either or both can articulate on said axle, for the purpose set forth.

5. A clearer to rake-teeth arranged upon an extension of the thills in rear of the axle of the carriage-wheels, said axle extending entirely across the carriage-frame, and so that, with the thills, it can articulate or oscillate on the axle, for the purposes set forth.

CALISTA E. COX, *Executrix.*

Witnesses:
REUBEN TENNY,
JOHN R. JESSON.